US009692882B2

(12) United States Patent
Mani et al.

(10) Patent No.: US 9,692,882 B2
(45) Date of Patent: Jun. 27, 2017

(54) AUTO-TUNING OF AN ACOUSTIC ECHO CANCELLER

(71) Applicant: Imagination Technologies Limited, Kings Langley (GB)

(72) Inventors: Senthil Kumar Mani, Hyderabad (IN); Gandhi Namani, Hyderabad (IN); Srinivas Akella, Hyderabad (IN); Sai Ravi Teja Pulugurtha, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 20 days.

(21) Appl. No.: 14/677,693

(22) Filed: Apr. 2, 2015

(65) Prior Publication Data
US 2015/0288807 A1 Oct. 8, 2015

(30) Foreign Application Priority Data

Apr. 2, 2014 (GB) .................................. 1405966.1

(51) Int. Cl.
*H04M 9/08* (2006.01)
*H04M 3/00* (2006.01)

(52) U.S. Cl.
CPC ........... *H04M 3/002* (2013.01); *H04M 9/082* (2013.01)

(58) Field of Classification Search
CPC ...... H04M 9/082; H04M 3/002; H04B 3/234; H04B 3/20
(Continued)

(56) References Cited

U.S. PATENT DOCUMENTS 6,694,017 B1 * 2/2004 Takada ..................... H04B 3/04
379/402
8,041,028 B2 * 10/2011 Adeney ................. H04M 9/082
370/286
(Continued)

FOREIGN PATENT DOCUMENTS

CA 2099575 7/1992
EP 1083675 A2 3/2001
(Continued)

OTHER PUBLICATIONS

Carini "The Road of an Acoustic Echo Controller for Mobile Telephony from Product Definition Till Production" Telit Mobile Terminals S.p.A. Viale Stazione di Prosecco 5/B I-34010 Sgonico (Trieste) Italy.

(Continued)

*Primary Examiner* — Alexander Jamal
(74) *Attorney, Agent, or Firm* — Vorys, Sater, Seymour and Pease LLP; Vincent M DeLuca

(57) ABSTRACT

A gain control system for dynamically tuning an echo canceller, the echo canceller being configured to estimate an echo of a far-end signal and subtract that estimate from a microphone signal to output an echo cancelled signal, the system comprising an echo measurement unit configured to calculate a ratio of the microphone signal to the far-end signal, an attenuation unit configured to attenuate at least one of the microphone signal and the far-end signal to output a second microphone signal and a second far-end signal to the echo canceller, the ratio of the second microphone signal to the second far-end signal being different from the calculated ratio, and an attenuation controller configured to control the attenuation unit, in dependence on the calculated ratio, so as to alter the ratio of the second microphone signal (Continued)

to the second far-end signal and control the echo-cancelled signal.

20 Claims, 9 Drawing Sheets

(58) Field of Classification Search
USPC ............ 379/406.04, 406.07, 406.16, 388.03, 379/406.08, 395
See application file for complete search history.

(56) References Cited

U.S. PATENT DOCUMENTS

| | | | |
|---|---|---|---|
| 2003/0026417 A1* | 2/2003 | Belt | H04B 3/23 379/387.01 |
| 2003/0123399 A1 | 7/2003 | Zhang et al. | |
| 2005/0058277 A1 | 3/2005 | Barron et al. | |
| 2005/0117739 A1* | 6/2005 | Demirekler | H04M 9/082 379/406.08 |
| 2006/0013383 A1* | 1/2006 | Barron | H04M 9/082 379/406.01 |
| 2007/0286404 A1* | 12/2007 | Popovic | H04B 3/237 379/406.01 |
| 2009/0036170 A1* | 2/2009 | Unno | H04M 9/082 455/570 |
| 2009/0245502 A1* | 10/2009 | Liu | H04M 9/082 379/406.08 |
| 2013/0329882 A1* | 12/2013 | Laturell | H04M 9/082 379/406.08 |

FOREIGN PATENT DOCUMENTS

| | | |
|---|---|---|
| WO | 9528774 A1 | 10/1995 |
| WO | 9625733 A1 | 8/1996 |

OTHER PUBLICATIONS

Birkett et al. "Limitations of Handsfree Acoustic Echo Cancellers due to Nonlinear Loudspeaker Distortion and Enclosure Vibration Effects" Department of Systems and Computer Engineering Carleton University, Ottawa, Canada.

Breining et al. "Acoustic echo control—An Application of Very High Order Adaptive Filters" published in IEEE Signal Processing Magazine, vol. 16, No. 4, pp. 42-69, 1999.

Haensler "From Algorithms to Systems—It's a Rocky Road" Signal Theory, Signal Theory, Darmstadt University of Technology and Proceedings of the IEEE, vol. 66, No. 12, Dec. 1978.

Faller et al. "Supressing Acoustic Echo in a Spectral Envelope Space" IEEE Transactions on Speech and Audio Processing, vol. 13, No. 5, Sep. 2005, pp. 1048-1062.

Ye et al. "A New Double-Talk Detection Algorithm Based on the Orthogonality Theorem" IEEE Transactions on Communications, vol. 39, No. 11, Nov. 1991, pp. 1542-1545.

Benesty et al. "Advances in Network and Acoustic Echo Cancellation" Springer-Verlag Berlin Heidelberg 2001, pp. 1-22.

"Adaptive Filtering in the Frequency Domain", Proceedings of the IEEE, vol. 66, No. 12, Dec. 1978, pp. 1658-1659.

Nguyen-Ky et al "An Improved Error Estimation Algorithm for Stereophonic Acoustic Echo Cancellation Systems" Faculty of Engineering and Surveying University of Southern Queensland Toowoomba Queensland 4350.

\* cited by examiner

AUTO-TUNING OF AN ACOUSTIC ECHO CANCELLER

BACKGROUND OF THE INVENTION

This invention relates to a method and apparatus for controlling tuning parameters of an acoustic echo canceller.

In telephony, an echo is a reflection of the voice signal. It is a delayed copy of the original. An example scenario is illustrated in FIG. 1a, which shows a signal being captured by a far-end microphone and output by a near-end loudspeaker. The echo is a consequence of acoustic coupling between the loudspeaker and the microphone; the microphone captures the signal originating from its own loudspeaker in addition to the voice of the near-end speaker and any background noise. The result is an echo at the far-end loudspeaker. Echo cancellation is an important feature of telephony. Hands-free devices and teleconferencing, in particular, require echo cancellation that can adapt to environments having a wide range of acoustic characteristics.

Acoustic echo cancellers typically synthesise an estimate of the echo from the far-end voice signal. The estimated echo is then subtracted from the microphone signal. This technique requires adaptive signal processing to generate a signal accurate enough to cancel the echo effectively. An adaptive filter is often used to model the environment's acoustic impulse response. The adaptive filter is often followed by a non-linear processor (NLP) for removing any residual echo. The non-linear processor may be accompanied by a comfort noise generator (CNG), since periods of complete silence can be disconcerting for a user.

The performance of the echo canceller depends on the platform, and particularly on the audio interface, the interface driver and related hardware, the pre and post amplifier (if any), and characteristics of microphone and speaker. It is challenging to achieve full duplex voice communication on a wide variety of platforms with sufficient echo cancellation. Therefore, the majority of echo cancellers require some form of platform-specific tuning to provide optimal performance. Often, this platform specific tuning has to be performed manually.

Therefore, there is a need for an improved method for tuning an acoustic echo canceller.

BRIEF SUMMARY OF THE INVENTION

According to a first embodiment, there is provided a gain control system for dynamically tuning an echo canceller, the echo canceller being configured to estimate an echo of a far-end signal and subtract that estimate from a microphone signal to output an echo cancelled signal, the system comprising an echo measurement unit configured to calculate a ratio of the microphone signal to the far-end signal, an attenuation unit configured to attenuate at least one of the microphone signal and the far-end signal to output a second microphone signal and a second far-end signal to the echo canceller, the ratio of the second microphone signal to the second far-end signal being different from the calculated ratio, and an attenuation controller configured to control the attenuation unit, in dependence on the calculated ratio, so as to alter the ratio of the second microphone signal to the second far-end signal and control the echo-cancelled signal.

The echo canceller may have multiple different modes of operation. The attenuation controller may be configured to associate each mode of operation of the gain control system with default attenuations of the microphone signal and the far-end signal.

The attenuation controller may be configured to, at the commencement of an estimation, control the attenuation unit to apply the default attenuations associated with the echo canceller's mode of operation and, thereafter, control the attenuation unit in dependence on the calculated ratio.

The attenuation controller may be configured to determine that an estimation has commenced if it determines that one or more of the following has occurred: a change in the mode of operation of the echo canceller; the start of a communication by the communication device; a change in the volume level of the communication device.

The gain control system may comprise a presence unit configured to, before the echo measurement unit calculates the ratio, check whether a signal energy of the far-end signal is above a predetermined threshold.

The echo measurement unit may be configured to, if the signal energy of the far-end signal is not above the predetermined threshold, not calculate the ratio until the signal energy of the far-end signal is found to be above the predetermined threshold.

The echo canceller may comprise an adaptive filter configured to generate an estimate of the echo from the second far-end signal, and the gain control system may comprise an adaptation counter configured to maintain a count of adaptation by the adaptive filter.

The adaptation counter may be configured to, before the echo measurement unit calculates the ratio, check whether the count is above a predetermined threshold.

The echo measurement unit may be configured to, if the count is not above the predetermined threshold, not calculate the ratio until the count is found to be above the predetermined threshold.

The gain control system may comprise a mode controller configured to, if the count is not above the predetermined threshold, control the echo canceller to operate in half-duplex mode.

The gain control system may comprise a single talk discriminator configured to determine whether the microphone signal is indicative of single talk.

The single talk discriminator may be configured to, before the echo measurement unit calculates the ratio, check whether the microphone signal is indicative of single talk.

The echo measurement unit may be configured to, if the microphone signal is determined not to be indicative of single talk, not calculate the ratio until the microphone signal is determined to be indicative of single talk.

The gain control system may comprise a mode controller configured to, if the microphone signal is determined not to be indicative of single talk, control the echo canceller to operate in full duplex mode if the echo canceller is already operating in that mode and to operate in half-duplex mode otherwise.

The single talk discriminator may be configured to compute a first ratio of a short term power of the error signal to a short term power of the microphone signal, compare the first ratio with a first predetermined threshold, and determine that the microphone signal is indicative of single talk if the first ratio is above the first predetermined threshold.

The single talk discriminator may be configured to, if the first ratio is not above the predetermined threshold, compute a second ratio of a short term power of the error signal to a long term power of the far-end signal, compare the second ratio with a predetermined threshold and determine that the microphone signal is indicative of single talk if the second ratio is above the second predetermined threshold.

The single talk discriminator may be configured to determine that the microphone signal is not indicative of single talk if the second ratio is not above the second predetermined threshold.

The echo measurement unit may be configured to, if the microphone signal is determined to be indicative of single talk, calculate the ratio of the microphone signal to the far-end signal.

The echo measurement unit may be configured to calculate the ratio of the microphone signal to the far-end signal by estimating a long-term average power of the microphone signal and a long-term average power of the far-end signal and calculating the ratio of the long-term average power of the microphone signal to the long-term average power of the far-end signal.

The gain control system may comprise a confirmation unit configured to monitor the calculated ratio and halt the calculation if the calculated ratio is determined to have been stable for a predetermined length of time.

The gain control system may comprise a mode controller configured to, if the calculated ratio is determined to have been stable for a predetermined length of time, control the echo canceller to operate in full duplex mode.

The attenuation controller may be configured to control the attenuation unit in dependence on a control signal from a convergence unit that is configured to monitor the stability of the adaptive filter.

According to a second embodiment, there is provided a method for dynamically tuning an echo canceller, the echo canceller being configured to estimate an echo of a far-end signal and subtract that estimate from a microphone signal to output an echo cancelled signal, the method comprising calculating a ratio of the microphone signal to the far-end signal, attenuating at least one of the microphone signal and the far-end signal to output a second microphone signal and a second far-end signal to the echo canceller, the ratio of the second microphone signal to the second far-end signal thereby being different from the calculated ratio and controlling the attenuation unit, in dependence on the calculated ratio, so as to alter the ratio of the second microphone signal to the second far-end signal and control the echo-cancelled signal.

The echo canceller may have multiple different modes of operation. The method may comprise associating each mode of operation of the gain control system with default attenuations of the microphone signal and the far-end signal.

The method may comprise, at the commencement of an estimation, controlling the attenuation unit to apply the default attenuations associated with the echo canceller's mode of operation and thereafter, controlling the attenuation unit in dependence on the calculated ratio.

The method may comprise determining that an estimation has commenced if one or more of the following has occurred: a change in the mode of operation of the echo canceller; the start of a communication by the communication device; a change in the volume level of the communication device.

The method may comprise, before calculating the ratio, checking whether a signal energy of the far-end signal is above a predetermined threshold.

The method may comprise, if the signal energy of the far-end signal is not above the predetermined threshold, not calculating the ratio until the signal energy of the far-end signal is found to be above the predetermined threshold.

The echo canceller may comprise an adaptive filter configured to generate an estimate of the echo from the second far-end signal, and the method may comprise maintaining a count of adaptation by the adaptive filter.

The method may comprise, before calculating the ratio, checking whether the count is above a predetermined threshold.

The method may comprise, if the count is not above the predetermined threshold, not calculating the ratio until the count is found to be above the predetermined threshold.

The method may comprise, if the count is not above the predetermined threshold, controlling the echo canceller to operate in half-duplex mode.

The method may comprise determining whether the microphone signal is indicative of single talk.

The method may comprise, before calculating the ratio, checking whether the microphone signal is indicative of single talk.

The method may comprise, if the microphone signal is determined not to be indicative of single talk, not calculating the ratio until the microphone signal is determined to be indicative of single talk.

The method may comprise, if the microphone signal is determined not to be indicative of single talk, controlling the echo canceller to operate in full duplex mode if the echo canceller is already operating in that mode and to operate in half-duplex mode otherwise.

The method may comprise computing a first ratio of a short term power of the error signal to a short term power of the microphone signal, comparing the first ratio with a first predetermined threshold and determining that the microphone signal is indicative of single talk if the first ratio is above the first predetermined threshold.

The method may comprise, if the first ratio is not above the predetermined threshold, computing a second ratio of a short term power of the error signal to a long term power of the far-end signal, comparing the second ratio with a predetermined threshold and determining that the microphone signal is indicative of single talk if the second ratio is above the second predetermined threshold.

The method may comprise determining that the microphone signal is not indicative of single talk if the second ratio is not above the second predetermined threshold.

The method may comprise, if the microphone signal is determined to be indicative of single talk, calculating the ratio of the microphone signal to the far-end signal.

The method may comprise calculating the ratio of the microphone signal to the far-end signal by estimating a long-term average power of the microphone signal and a long-term average power of the far-end signal and calculating the ratio of the long-term average power of the microphone signal to the long-term average power of the far-end signal.

The method may comprise monitoring the calculated ratio and halting the method for dynamically tuning an echo canceller if the calculated ratio is determined to have been stable for a predetermined length of time.

The method may comprise, if the calculated ratio is determined to have been stable for a predetermined length of time, controlling the echo canceller to operate in full duplex mode.

The method may comprise controlling the attenuation unit in dependence on a control signal from a convergence unit that is configured to monitor the stability of the adaptive filter.

According to a third embodiment, there is provided machine readable code for implementing the above method.

According to a fourth embodiment, there is provided machine readable storage medium having encoded thereon non-transitory machine-readable code for implementing the above method.

BRIEF DESCRIPTION OF THE DRAWINGS

The present invention will now be described by way of example with reference to the accompanying drawings. In the drawings.

DETAILED DESCRIPTION OF THE INVENTION

Figure 1A:
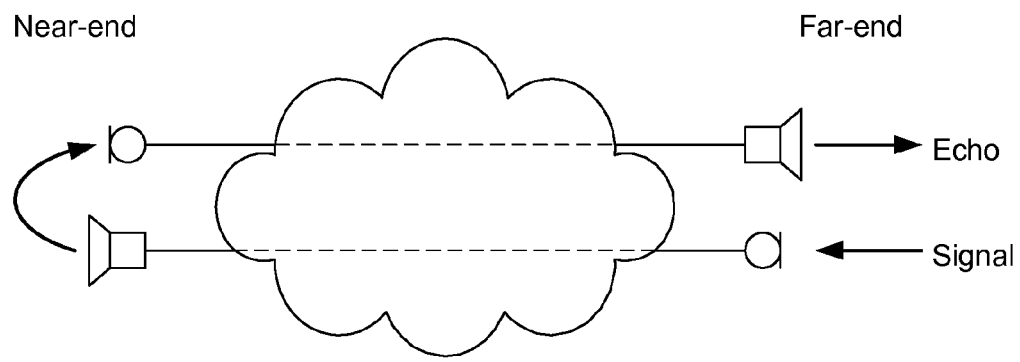
FIG. 1a shows an example of two communication devices.
Figure 1B:
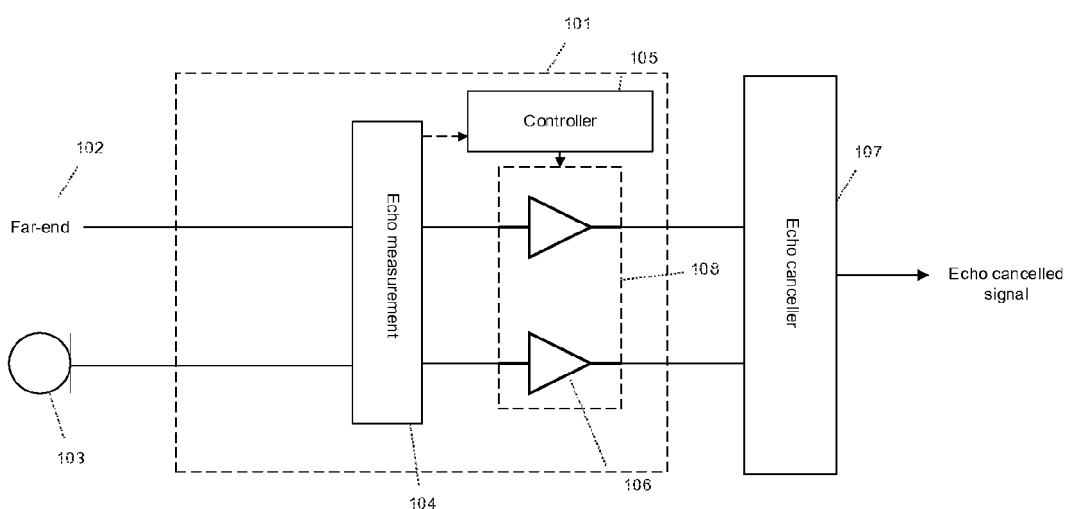
FIG. 1b shows an example of a gain control system.

An example of a gain control system is shown in FIG. 1b. The gain control system, shown generally at 101, comprises an echo measurement unit 104, a controller 105 and an attenuation unit 108, which comprises one or more individual attenuators 106. The gain control system receives a microphone signal 103 and a far-end signal 102 as inputs. It outputs a second microphone signal and a second far-end signal to an echo canceller 107. The echo canceller is configured to estimate an echo of the far-end signal and subtract that estimate from the (second) microphone signal to output an echo cancelled signal.

The echo measurement unit is configured to calculate a ratio of the microphone signal to the far-end signal. The attenuation unit is configured to receive the microphone signal and the far-end signal as inputs and attenuate at least one of them. The signals output by the attenuation unit are the "second" microphone and far-end signals. A "second" signal may be an attenuated version of the original or the same as the original (if the original was not attenuated). The attenuation controller is configured to control the attenuation unit, preferably in dependence on the ratio calculated by the echo measurement unit. The attenuation controller thus controls the ratio of the two signals input into the echo canceller. The attenuation controller preferably controls this ratio be different from a comparative ratio of the original signals. (The ratio could, for example, be an amplitude ratio, a power ratio or an energy ratio. Preferably the ratio provides an indication of the ERL, e.g. as defined in Equation 9 below). Thus, the attenuation controller also controls the echo cancelled signal.

The echo canceller shown in FIG. 1b will typically include an adaptive filter for modelling the echo path and a subtractor. The adaptive filter is configured to filter the far-end signal to generate an estimate of the echo. The actual echo is part of the microphone signal. The subtractor is configured to subtract the echo estimate from the microphone signal to output an echo cancelled signal. If the adaptive filter has modelled the echo path correctly, the echo cancelled signal should contain substantially no echo. The echo cancelled signal also provides the adaptive filter with feedback: the filter adjusts its modelling of the echo path in dependence on how much of the microphone signal (and thus the echo) remains after the subtraction. Therefore, by controlling the echo cancelled signal, the attenuation controller also controls the feedback to the adaptive filter.

The adaptive filter in an echo canceller is often implemented in integer format due to the high resource requirements of implementing the filter in a fractional format. The filter coefficients are often represented by 16 bits, and sometimes by 32 bits. The restricted number of bits inherently limits the performance of the acoustic echo canceller in some scenarios.

The performance of the adaptive filter can be affected by the strength of the echo. An indication of echo strength can be obtained by comparing the relative strengths of the far-end signal and the microphone signal. Echo Return Loss (ERL) is one parameter that measures the loss of the original signal in the echo. A high, positive ERL indicates a large loss of the original signal in the echo. This corresponds to a relatively small echo. A negative ERL indicates the echo displays some gain with respect to the original signal. This corresponds to a relatively large echo.

When ERL is a high, negative value, filter coefficients may saturate or underflow or overflow. One simple way to address this problem is by attenuating the microphone signal used for error estimation. The error is used for adaptation of the adaptive filter coefficients. Attenuating the microphone signal may therefore prevent the filter coefficients from saturating, overflowing or under flowing by reducing the error. The error signal is preferably re-scaled to obtain the actual error for subsequent processing.

Similarly, when ERL is a high, positive value (e.g. greater than 30 dB), an integer representation of coefficients may not be capable of estimating the echo. In this scenario, the far-end signal input into the adaptive echo canceller may be attenuated for echo estimation. Attenuating the far-end signal makes the microphone signal appear correspondingly larger, thus increasing the filter coefficients to a realisable size.

Echo path modelling by the adaptive filter may also be sub-optimal due to platform non-linearity, high background noise capture etc. In scenarios such as this, optional parts of the acoustic echo canceller (e.g. the residual echo suppressor and non-linear processor) may also not perform as expected. This can lead to significant residual echo leakage, which can severely impact the communication.

By controlling the echo cancelled signal, the gain control system controls the feedback that is provided to the adaptive filter. This allows the gain control system to constrain adaptation by the adaptive filter, so that it does not try to model an echo that lies outside the filter's modelling range due to the inherent limitations of its integer coefficients.

The gain control system preferably estimates the attenuations that should be applied to the microphone signal and far-end signal dynamically, in order to accommodate varying echo path environments and diverse platforms without platform-specific manual tuning.

In most implementations the gain controller will form part of a communication device, such as a mobile phone, smart phone, line connected phone, laptop, tablet, teleconferencing equipment etc. A typical communication device includes a loudspeaker for outputting the far-end signal, a microphone for detecting the near-end signal, a CPU, memory, signal processing circuitry, such as a DSP and filters, etc.

The structures shown in FIG. 1b (and indeed all the block apparatus diagrams included herein) are intended to correspond to a number of functional blocks. This is for illustrative purposes only. FIG. 1b is not intended to define a strict division between different parts of hardware on a chip or between different programs, procedures or functions in software. In some embodiments, some or all of the algorithms described herein may be performed wholly or partly in hardware. In many implementations, at least part of the gain control system may be implemented by a processor acting under software control (e.g. the CPU or DSP of a communication device). Any such software is preferably stored on a non-transient computer readable medium, such as a memory (RAM, cache, hard disk etc) or other storage means (USB stick, CD, disk etc).

Often the main source of signal energy in the microphone signal will be an echo of the far-end signal; there is no other source of significant signal energy at the near-end. This is denoted "single talk" herein. At other times, the microphone signal will contain significant signal energy that is independent of any echo. In many instances this will be due to talking at the near-end. This is denoted "double talk" herein. The signal energy might, of course, be due to a different source than talking. This is particularly true during teleconferencing or hands-free operation. The term "double talk" is therefore used to refer to any significant signal energy in the near-end signal that is not due to an echo.

Figure 2:
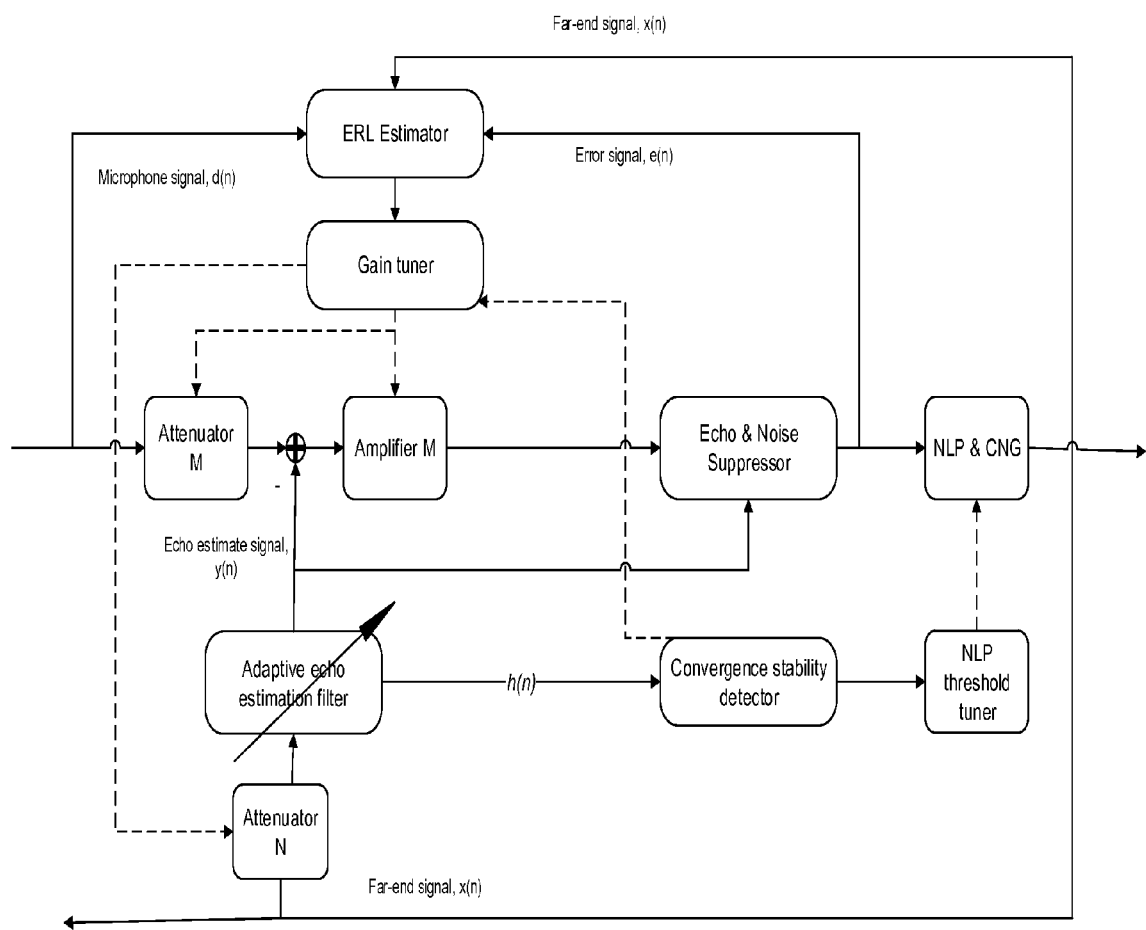
FIG. 2 shows an example of an acoustic echo canceller that implements auto-tuning.

An example of a practical implementation of a gain control system within an acoustic echo canceller is shown in FIG. 2. FIG. 2 is a high level block diagram of an acoustic echo canceller. The acoustic echo canceller implements an algorithm for estimating the optimal microphone attenuation, far-end attenuation and NLP threshold. The notations x(n), d(n), e(n) and y(n) denote the far-end signal, microphone signal, error signal and echo estimate signals respectively at discrete time instant n. h(n) denotes the impulse response of the echo path and M and N are the gain/attenuation factors applied to the microphone signal and the far-end signal respectively (corresponding to the attenuation unit 108 in FIG. 1b).

The functional blocks of the acoustic echo canceller include an adaptive filter, an echo suppressor and a non-linear processor/comfort noise generator. The adaptive filter models the echo path and synthesises an estimate of the echo signal. The echo suppressor and non-linear processor are configured to deal with any residual echo or noise, after the estimated echo has been subtracted from the microphone signal. The residual echo can be quite strong. For example, if the echo path changes dramatically during a period of double talk, tracking of the echo path changes by the adaptation filter may be inhibited by the detected double talk, potentially leading to a strong residual echo. The echo suppressor attenuates the residual echo in dependence on the estimated echo. The non-linear processor removes any remaining residual error by clipping. It often achieves this by simply reducing its gain to zero when its input falls below a time-varying threshold. The comfort noise generator may insert comfort noise during periods of clipping to avoid disconcerting periods of silence.

The acoustic echo canceller shown in FIG. 2 also includes an ERL estimator, a gain tuner, a convergence stability detector and a NLP threshold tuner. The ERL estimator (corresponding to the echo estimator 104 in FIG. 1b) estimates the echo return loss using the microphone signal d(n) and the far-end signal x(n). It also receives the error signal e(n). The ERL estimator provides control input to the gain tuner (corresponding to the attenuation controller 105 in FIG. 1b), which in turn controls the attenuators and amplifier. The convergence stability detector estimates the stability of the adaptive filter. It provides control input to the NLP threshold tuner, which in turn controls the NLP threshold for arresting residual echo leakage. It also provides an input to the gain tuner.

The far-end signal x(n) passes through an attenuator en route to the adaptive filter. The adaptive filter models the echo path. It filters the far-end signal to generate an estimate of the echo. That echo forms part of the microphone signal. The echo estimate is subtracted from a (potentially attenuated) microphone signal d(n). If the microphone signal has been attenuated, the amplitude of the echo cancelled signal is lower than it would otherwise have been. The echo cancelled signal is therefore amplified before further processing, to reverse any attenuation applied to the microphone signal. (It is the unamplified version of the echo cancelled signal that is fed back to the adaptive filter). The remaining signal may be attenuated in dependence on the estimated echo and using the NLP threshold. The resulting signal is then transmitted to the far-end.

Figure 1C:
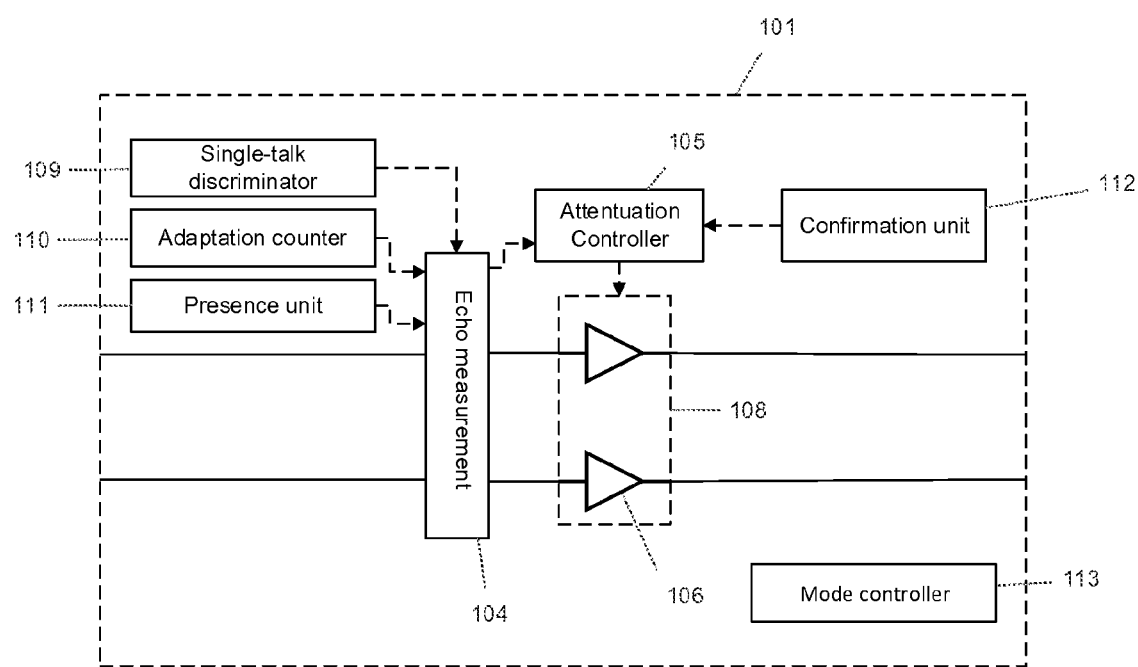
FIG. 1c shows an example of a gain control system.
Figure 3:
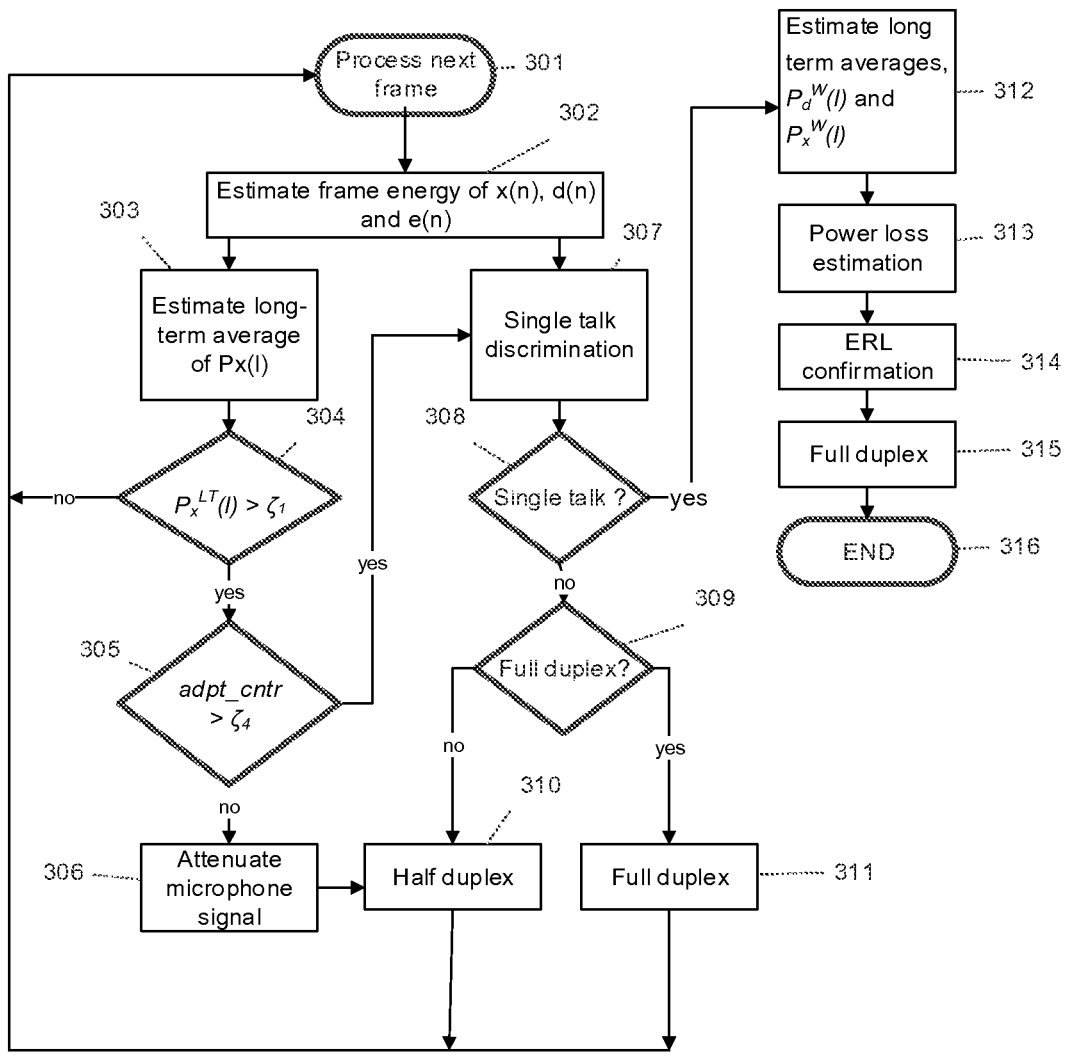
FIG. 3 shows an example of a gain tuning algorithm.

The actions of the ERL estimator and gain tuner will now be explained in more detail with reference to FIG. 3, which illustrates an algorithm for automatically controlling the gain of an acoustic echo canceller, and FIG. 1c, which shows a gain control system in more detail.

The algorithm starts with receiving a new frame for processing (step 301). The energy of the microphone signal, the far-end signal and the error signal is estimated for every frame (step 302) by the presence unit 111.

$$P_x(l) = \Sigma_{i=0}^{N-1} x(i)^2 \quad (1)$$

$$P_d(l) = \Sigma_{i=0}^{N-1} d(i)^2 \quad (2)$$

$$P_e(l) = \Sigma_{i=0}^{N-1} e(i)^2 \quad (3)$$

N is the frame size, which typically each frame might be of 10 msec duration.

The long term power of the far-end signal is then computed (step 303):

$$P_x^{LT} = \alpha P_d^{LT}(l-1) + (i-\alpha) P_x(l) \quad (4)$$

The long term power of the far-end signal computed via equation 4 is compared with a predetermined threshold, $\zeta_1$ (step 304). This is to check for a far-end presence. If the long term power of the far-end signal is greater than threshold $\zeta_1$, a far-end signal presence is confirmed. Otherwise the presence of a far-end presence is unconfirmed, and the algorithm repeats with the next frame. The acoustic echo canceller, meanwhile, operates in full duplex mode.

ERL estimation is preferably only performed when the microphone is detecting an echo. Thus, checking for the presence of a far-end signal before estimating the ERL assists in both achieving an accurate estimation of the ERL and reducing CPU power consumption.

The adaptive filter adapts when the far-end is active and the near-end is inactive. The presence unit has already determined that the far-end is active. The adaptation counter then checks whether the adaptation count has met a predefined threshold $\zeta_4$ (step 305). If the adaptation count does not meet the threshold, this may be because the filter coefficients have saturated, overflowed or under flowed in the presence of a high negative ERL. Hence the microphone signal is attenuated further (step 306), so that an acceptable adaptive filter cancellation is obtained even under low ERL conditions. A minimally acceptable adaptive filter cancellation might be, for example, 6 dB. Attenuating the microphone signal further should also cause the adaptation filter to start adapting and the count to increase. The acoustic echo canceller also switches to half duplex mode to block the echo from the far-end (step 310).

If the adaptation counter does meet the predefined value, then single talk discrimination is invoked (step 307).

ERL estimation is performed during regions of single talk for reasons of accuracy. The ERL estimator's functionality depends to a great extent on the discrimination of single talk regions in the microphone output. Spurious detection of a single talk region may lead to an incorrect estimation of ERL. A delay in single talk detection or detecting single talk as double talk or a near-end presence may lead to a delay in ERL estimation; it does not, however, impact the accuracy of the estimation. The algorithm suitably employs a simple logic for single talk discrimination.

Figure 4:
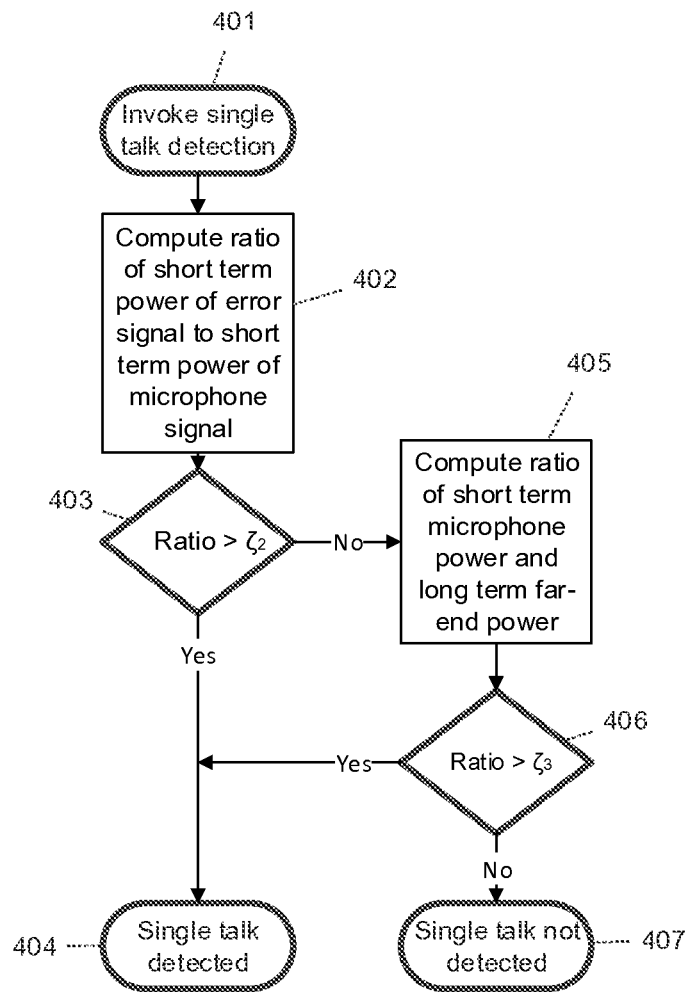
FIG. 4 shows an example of a single talk detection algorithm.

The single talk discriminator 109 may be configured to detect single talk regions via any suitable method. One option is to compare the time-domain power level of the microphone signal and the error signal. Another example of an algorithm for single talk discrimination is shown in FIG. 4.

First, the short term power of the microphone and far-end signals over a predefined window are computed (step 402):

$$P_d^W(l) = \Sigma_{i=0}^{W-1} P_d(i) \quad (5)$$

$$P_x^W(l) = \Sigma_{i=0}^{W-1} P_x(i) \quad (6)$$

In one example, the window W is 32 frames.

A single talk region may be detected, and ERL measurement invoked, whenever the ratio between the power level of the short term microphone signal and the short term error signal exceeds a predetermined ratio, $\zeta_2$ (step 403). This may also be expressed in dB. In one example, a single talk region is detected whenever the power of the error signal is at least 6 dB lower than the power level of the microphone signal.

In some scenarios, the adaptive filter does not achieve a 6 dB attenuation because of a very high positive ERL (meaning that the echo is small). Therefore, another option for detecting single talk regions is to compare the short term microphone power with the long term far-end power (step 405). A single talk region may be detected whenever the ratio between the power level of the short term microphone signal and the long term far-end signal exceeds a predetermined ratio G (step 406). This may also be expressed in dB. This criterion may be applied in addition to the criterion above. For example, if the power of microphone signal is not at least 6 dB higher than power of error signal, then the acoustic echo canceller may compare the short term power level with the long term far-end power before confirming the absence of single talk. By the end of single talk discrimination, the current frame of the microphone signal is either designated as single talk (step 404) or not (step 407).

Returning to FIGS. 3 and 1c, if single talk is not detected (step 308), the mode controller 113 causes the acoustic echo canceller to operate in full duplex mode if it was already operating in full duplex mode (steps 309 and 310). If the acoustic canceller was not operating in full duplex mode before, the mode controller causes it to operate in half duplex mode (steps 309 and 311).

If a single talk region is identified, the echo measurement unit estimates long term averages of the far-end signal and the microphone signal using the short term averages computed previously (step 312).

$$P_d^L(l) = \begin{cases} \alpha_1 P_d^L(l-1) + (1-\alpha_1) P_d^W(l) & \text{if } P_d^W(l) > P_d \\ \alpha_2 P_d^L(l-1) + (1-\alpha_2) P_d^W(l) & \text{otherwise} \end{cases} \quad (7)$$

$$P_x^L(l) = \begin{cases} \alpha_1 P_x^L(l-1) + (1-\alpha_1) P_x^W(l) & \text{if } P_x^W(l) > P_x \\ \alpha_2 P_x^L(l-1) + (1-\alpha_2) P_x^W(l) & \text{otherwise} \end{cases} \quad (8)$$

This averaging process may be achieved using a low pass filter.

The next step for the echo measurement unit is to calculate a ratio of the microphone signal to the far-end signal. The ratio suitably represents the relative signal strength of the two signals. Any suitable calculation and measure might be used; in this example, the echo measurement unit uses the ERL. The power loss between the far-end signal and the echo is first estimated using the long term averages calculated for the microphone signal and the far-end signal (step 312). The ERL is computed in step 313 and is given by:

$$ERL = 10 \log_{10} \left\{ \frac{P_d^L(l)}{P_x^L(l)} \right\} \quad (9)$$

The following table compares ERL values on a linear scale and a logarithmic scale:

TABLE 1

ERL values on a linear scale and a logarithmic scale.

| ERL | ERL(dB) |
|---|---|
| 0.0158 | −18 |
| 0.0631 | −12 |
| 0.2512 | −6 |
| 0.5012 | −3 |
| 1 | 0 |
| 1.9953 | 3 |
| 3.9811 | 6 |
| 15.8489 | 12 |
| 63.0957 | 18 |
| 251.1886 | 24 |

Figure 5:
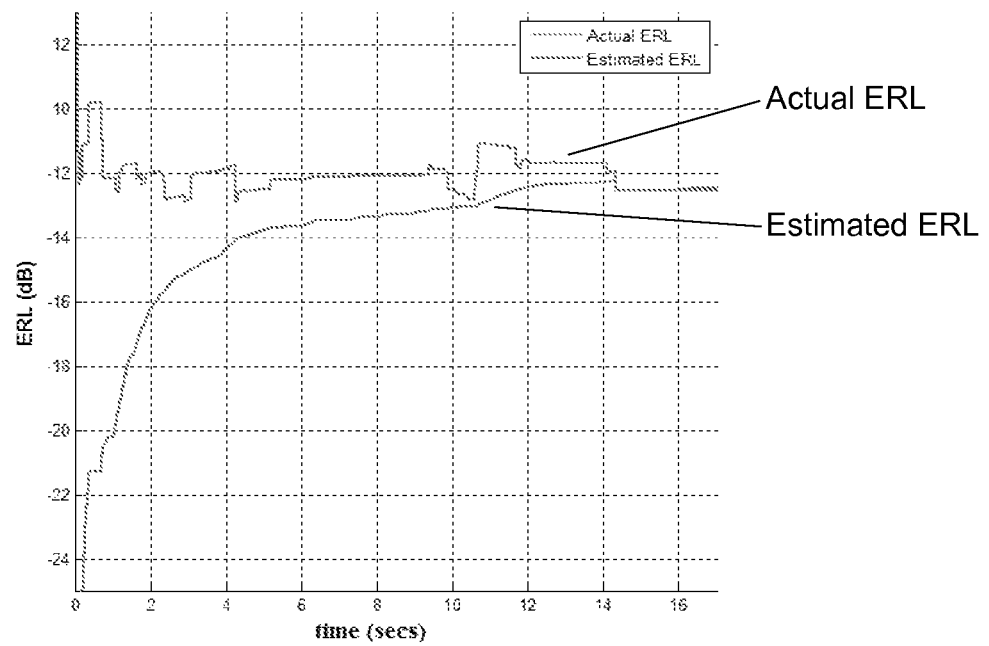
FIG. 5 shows an estimated ERL and an actual ERL.

The ERL estimates will gradually approach the actual ERL as the adaptive filter improves its modelling of the acoustic echo path. This is shown in FIG. 5. ERL estimation continues till the confirmation block (112) confirms the stability of the ERL estimate (step 314). If the ERL estimate is stable, acoustic echo canceller is operated in full duplex mode (step 315). The confirmation block preferably determines that the ERL estimate is stable if any fluctuations are confined within a predetermined range for at least a predetermined period of time. A suitable period of time might be 3 seconds, for example. The ERL estimation is, however, preferably reinitialised for every operational change likely to affect the ERL. Examples include call start-up, audio mode change and volume level change.

Table 2 provides typical default values of microphone attenuation and far-end attenuation for different modes of operation of the communication device. Examples of different audio modes include "speaker mode", "handset mode" and "headset mode". Each mode of operation may correspond to an expected type of echo path between the loudspeaker and the microphone. The aim of these default values is to ensure that the adaptive filter is capable of estimating the echo even under high negative ERL conditions. Another aim is to assist in faster estimation of the ERL. The attenuation controller is preferably configured to apply these default values at the commencement of any auto-tuning operation. The gain control system will reinitialize the auto-tuning process and return to the default values at call start-up, mode change and volume level change.

TABLE 2

Default tunable values for microphone and far-end attenuation

| Audio mode | Default value | |
|---|---|---|
| | Microphone Attenuation | Far-end Attenuation |
| Speaker | 4 | 1 |
| Handset | 0 | 2 |
| Headset | 0 | 5 |

One aim of gain tuning is to optimize these attenuation values for a real-life platform and mode of operation, without requiring manual tuning. For example, appropriate adjustments should be made to the microphone and far-end signals so that the filter coefficients do not saturate. Another aim is to provide full duplex operation to the maximum extent possible without noticeable echo.

"Speaker Mode" Tuning

In general, the ERL in speaker mode is likely to be lower than 0 dB. Some platforms may have a negative ERL of up to 24 dB. Default gain values tend to be set to handle very low ERL cases so that the adaptive filter can work on wide range of ERLs of down to −24 dB. The ERL might in reality be higher than the default gain values allow for, however, and the high attenuation of the microphone signal affects the double talk performance of the filter. Table 3 below is an example of how the gains might be set depending on the ERL. It is apparent from comparing table 3 with the "speaker mode" values in Table 2 that the microphone attenuation is reduced if the ERL is higher than expected. Estimating the ERL thus enables the optimal gains to be set automatically, meaning that performance of the adaptive filter can be optimized.

TABLE 3

Tuneable values in Speaker audio mode

| Estimated ERL | Microphone Attenuation | Far-end Attenuation |
|---|---|---|
| 0 dB | 2 | 1 |
| −6 dB | 3 | 1 |
| −12 dB | 4 | 1 |

In general the ERL that is experienced by the echo canceller depends on the attenuations that are applied to both the far-end signal and the microphone signal. Attenuating the microphone signal compensates for negative ERLs. Attenuating the far-end signal decreases the ERL compensation. The balance between the microphone and far end attenuations determines the ratio of these signals that is input into the echo canceller.

Figure 6:
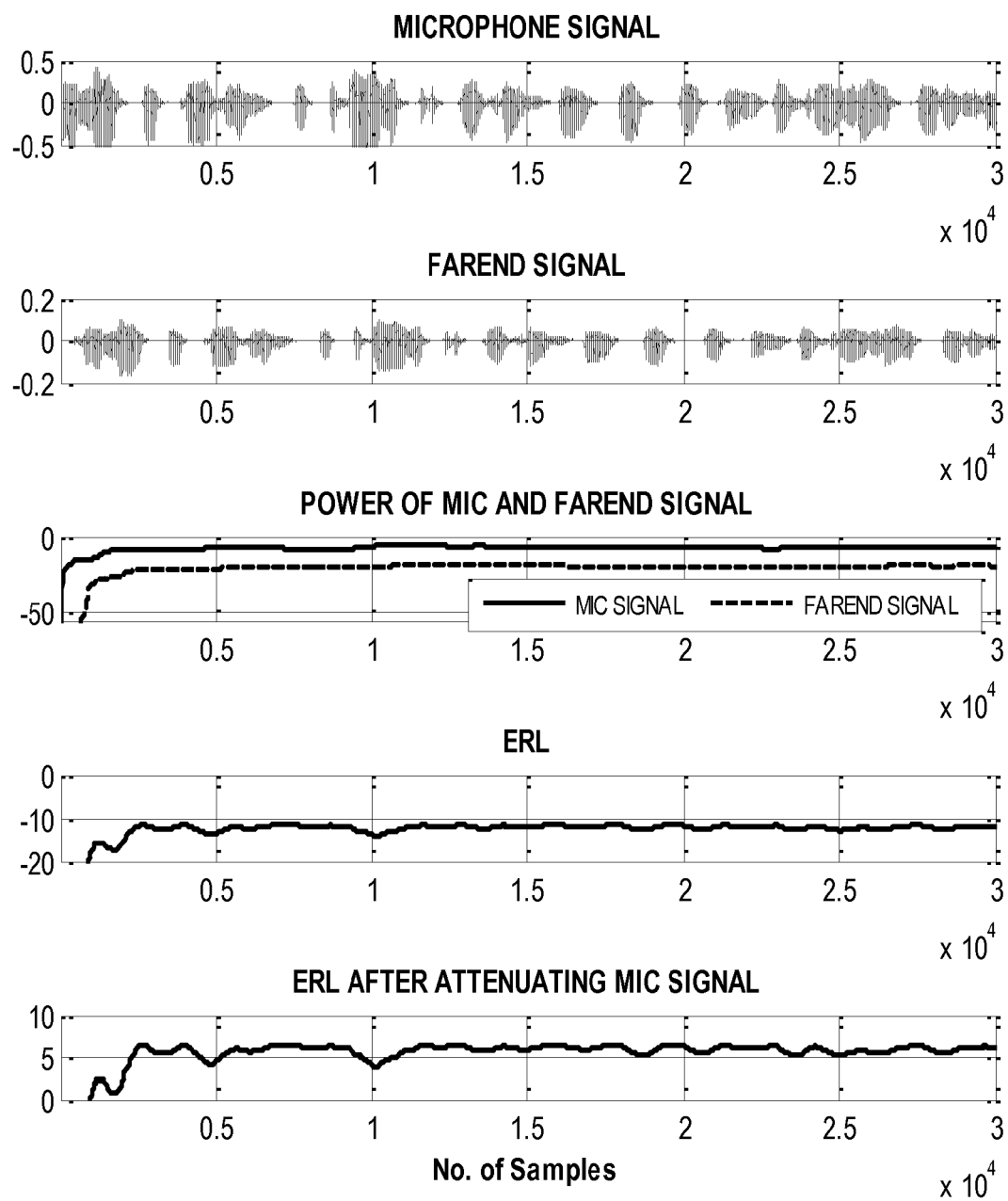
FIG. 6 shows an example of a microphone signal, a far-end signal and the change in ERL that results from attenuating the microphone signal.

FIG. 6 illustrates an example of a far-end signal and a microphone signal. The signals give an ERL of −12 dB. In order to achieve a positive ERL, the microphone signal is attenuated by 18 dB (i.e. the microphone attenuation value is 3), with the consequence that the effective ERL is 6 dB. In this example, the microphone attenuation was not 4 (as indicated by Table 3) because no far end attenuation was applied. Table 3 indicates a far-end attenuation of 1. Thus, since the far-end attenuation was not applied, the correct microphone attenuation was 3 to give an effective ERL of 6 dB.

"Handset Mode" Tuning

In general, the ERL in handset audio mode is likely to be more than 12 dB (i.e. the echo power level at the microphone is less than four times the far-end signal power level at the loudspeaker). The default tunable values tend to be set to handle an ERL of 12 dB. Some platforms will have a higher positive ERL than the default, however, and will consequently require attenuation of the far-end signal for complete cancellation of the echo by the adaptive filter. Similarly, platforms having an ERL of less than 12 dB may require the microphone signal to be attenuated. Table 4 below is an example of how the gains might be set depending on the ERL.

TABLE 4

Tuneable values in Handset audio mode

| Estimated ERL | Microphone Attenuation | Far-end Attenuation |
|---|---|---|
| 6 dB | 1 | 0 |
| 12 dB | 0 | 2 |
| 24 dB | 0 | 5 |

"Headset Mode" Tuning

In general, the ERL in headset audio mode is likely to be more than 24 dB (i.e. the echo power level at the microphone is likely to be less than the eight times the far-end signal power level at handset speaker). The default tunable values tend to be set to support an ERL of 24 dB. The far-end signal may have to be attenuated if the ERL exceeds 24 dB, and that attenuation may have to be reduced from its default value if the ERL falls below its expected value.

TABLE 5

Tuneable values in Headset audio mode

| Estimated ERL | Microphone Attenuation | Far-end Attenuation |
|---|---|---|
| 12 dB | 0 | 3 |
| 24 dB | 0 | 5 |
| 30 dB | 0 | 6 |

In addition, the microphone signal may also have to be attenuated when the adaptive filter does not adapt during far-end active regions, whatever the audio mode. Similarly, gain tuning may be required to avoid saturation in the adaptive filter coefficients if the convergence stability detector (see FIG. 2) indicates that saturation has occurred.

The convergence stability detector monitors the coefficients of the filter. In particular, it monitors the filter coefficients in the dominant area of the modelled echo path and estimates the convergence stability of the adaptive filter based on the variation in those filter coefficients with time. The principle role of the convergence stability detector is to control the NLP threshold. If adaptive filter has stable convergence, the NLP threshold is set to a relatively low value to provide full duplex performance. If the adaptive filter has marginal convergence or if convergence is lower than an acceptable minimum, the NLP threshold is set to a higher value to arrest the residual echo leakage from the acoustic echo canceller. In this case, depending on the instability in the adaptive filter, voice breaks may result as the non-linear processor clips the outgoing signal. In addition to tuning the NLP threshold, the convergence stability detector also helps in confirming the microphone attenuation controlled by the ERL estimator. The convergence stability detector thus provides additional gain control.

Performance of the algorithm described herein has been tested in three different acoustic echo regions: pure single talk, double talk and near-end-alone regions. The metric used to evaluate the performance of the algorithm is the time taken to freeze the far-end attenuation, microphone attenuation and NLP threshold. The estimated values for these parameters were compared with expected values obtained by manually tuning the parameters to provide echo-free, full duplex communication. This comparison was performed across five different reference platforms (each being a particular make and model of communication device).

The algorithm was implemented using the constants and thresholds listed in Table 8. It was integrated into an IMG Voice engine and tested on various different mobile platforms. The evaluation tests used a wideband codec (16 kHz sampling rate) and an adaptive filter tail length of 512 taps (corresponding to a 32 ms tail length). In all testing, the parameters were initialized to the values provided in Table 9 and the response times were noted for handset, hands-free and headset audio modes during double talk, single talk and near-end alone cases. To test the gain control system's performance, the double talk test case used an overlap region of 80% of the total call duration.

The first point of note is that the gain control algorithm settled on tuning parameters for all audio modes. This confirms that the algorithm provides optimal acoustic echo canceller performance without manual tuning.

(a) Speaker Mode

Figure 7:
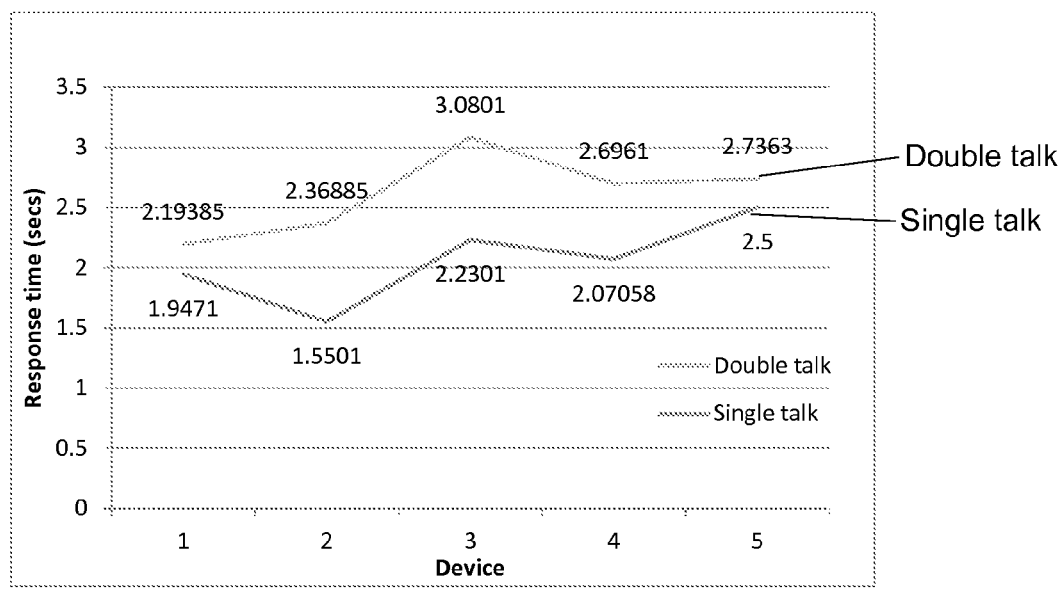
FIG. 7 shows response times of different devices in speaker mode.

FIG. 7 illustrates the response time for the devices in hands free mode during single talk and double talk. The response time during single talk has an average value of around 2.1 seconds, while during double talk it is around 2.6 seconds.

(b) Handset Mode

Figure 8:
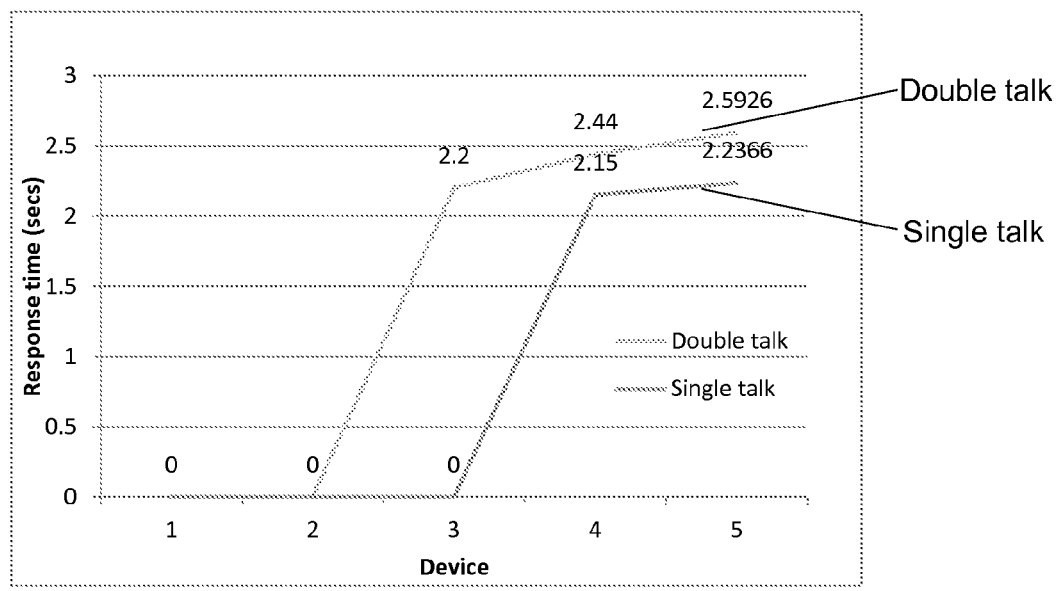
FIG. 8 shows response times of different devices in handset mode.

FIG. 8 illustrates the response time for the devices in handset mode during single talk and double talk. Similar to hands free mode, the response time during single talk has an average value of around 2.2 seconds, while during double talk it is around 2.45 seconds.

(c) Headset Mode

Figure 9:
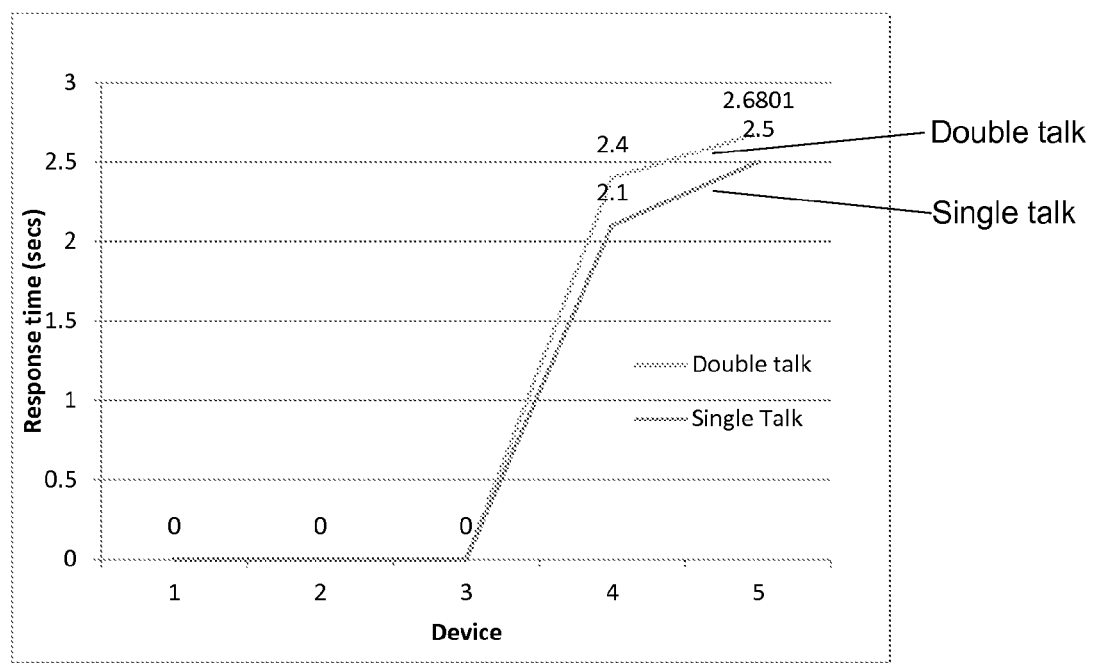
FIG. 9 shows response times of different devices in headset mode.

FIG. 9 illustrates the response time for the devices in headset mode during single talk and double talk. The response time during single talk has an average value of 2.3 seconds while during double talk it is 2.5 seconds.

TABLE 9

Constants and thresholds used

| Parameters | Value |
| --- | --- |
| $\gamma_A$ | 0.95004 |
| $\gamma_B$ | 0.8999 |
| $\gamma_C$ | 0.8001 |
| $\gamma_{C-A}$ | 0.049989 |
| $\beta_{th}$ | 0.2 |
| $\zeta_1$ | 0.0001 |
| $\zeta_2$ | 0.3 |
| $\zeta_3$ | 0.2 |
| $\zeta_4$ | 50 |

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A gain control system for dynamically tuning an echo canceller, the echo canceller being configured to estimate an echo of a far-end signal and subtract that estimate from a microphone signal to output an echo cancelled signal, the system comprising:
   an echo measurement unit configured to calculate a ratio of a first microphone signal to a first far-end signal;
   an attenuation unit configured to attenuate at least one of the first microphone signal and the first far-end signal to output a second microphone signal and a second far-end signal to the echo canceller, the ratio of the second microphone signal to the second far-end signal being different from the calculated ratio; and
   an attenuation controller configured to control the attenuation unit, in dependence on the calculated ratio, so as to alter the ratio of the second microphone signal to the second far-end signal and control the echo-cancelled signal.

2. A gain control system as claimed in claim 1, in which the echo canceller has multiple different modes of operation, the attenuation controller being configured to associate each mode of operation of the gain control system with default attenuations of the first microphone signal and the first far-end signal.

3. A gain control system as claimed in claim 2, the attenuation controller being configured to:
   at the commencement of an estimation, control the attenuation unit to apply the default attenuations associated with the echo canceller's mode of operation; and
   thereafter, control the attenuation unit in dependence on the calculated ratio.

4. A gain control system as claimed in claim 1, the attenuation controller being configured to determine that an estimation has commenced if it determines that one or more of the following has occurred: a change in the mode of operation of the echo canceller; the start of a communication by the communication device; a change in the volume level of the communication device.

5. A gain control system as claimed in claim 1, comprising a presence unit configured to, before the echo measurement unit calculates the ratio, check whether a signal energy of the first far-end signal is above a predetermined threshold, the echo measurement unit being configured to, if the signal energy of the first far-end signal is not above the predetermined threshold, not calculate the ratio until the signal energy of the first far-end signal is found to be above the predetermined threshold.

6. A gain control system as claimed in claim 1, the echo canceller comprising an adaptive filter configured to generate an estimate of the echo from the second far-end signal, and the gain control system comprising an adaptation counter configured to maintain a count of adaptation by the adaptive filter;

the adaptation counter being configured to, before the echo measurement unit calculates the ratio, check whether the count is above a predetermined threshold; and the echo measurement unit being configured to, if the count is not above the predetermined threshold, not calculate the ratio until the count is found to be above the predetermined threshold.

7. A gain control system as claimed in claim 1, the gain control system comprising a mode controller configured to, if the count is not above the predetermined threshold, control the echo canceller to operate in half-duplex mode.

8. A gain control system as claimed in claim 1, the gain control system comprising a single talk discriminator configured to determine whether the first microphone signal is indicative of single talk; the single talk discriminator being configured to, before the echo measurement unit calculates the ratio, check whether the first microphone signal is indicative of single talk; and the echo measurement unit being configured to, if the first microphone signal is determined not to be indicative of single talk, not calculate the ratio until the first microphone signal is determined to be indicative of single talk.

9. A gain control system as claimed in claim 8, the gain control system comprising a mode controller configured to, if the first microphone signal is determined not to be indicative of single talk, control the echo canceller to operate in full duplex mode if the echo canceller is already operating in that mode and to operate in half-duplex mode otherwise.

10. A gain control system as claimed in claim 8, the single talk discriminator being configured to:
compute a first ratio of a short term power of the error signal to a short term power of the first microphone signal;
compare the first ratio with a first predetermined threshold; and
determine that the first microphone signal is indicative of single talk if the first ratio is above the first predetermined threshold.

11. A gain control system as claimed in claim 10, the single talk discriminator being configured to, if the first ratio is not above the predetermined threshold:
compute a second ratio of a short term power of the error signal to a long term power of the first far-end signal;
compare the second ratio with a predetermined threshold; and
determine that the first microphone signal is indicative of single talk if the second ratio is above the second predetermined threshold.

12. A gain control system as claimed in claim 11, the single talk discriminator being configured to determine that the first microphone signal is not indicative of single talk if the second ratio is not above the second predetermined threshold.

13. A gain control system as claimed in claim 1, the echo measurement unit being configured to calculated the ratio of the first microphone signal to the first far-end signal by:
estimating a long-term average power of the first microphone signal and a long-term average power of the first far-end signal; and
calculating the ratio of the long-term average power of the first microphone signal to the long-term average power of the first far-end signal.

14. A gain control system as claimed in claim 1, the gain control system comprising a confirmation unit configured to monitor the calculated ratio and halt the calculation if the calculated ratio is determined to have been stable for a predetermined length of time.

15. A gain control system as claimed in claim 14, the gain control system comprising a mode controller configured to, if the calculated ratio is determined to have been stable for a predetermined length of time, control the echo canceller to operate in full duplex mode.

16. A gain control system as claimed in claim 1, the attenuation controller being configured to control the attenuation unit in dependence on a control signal from a convergence unit that is configured to monitor the stability of the adaptive filter.

17. A method for dynamically tuning an echo canceller, the echo canceller being configured to estimate an echo of a far-end signal and subtract that estimate from a microphone signal to output an echo cancelled signal, the method comprising:
calculating a ratio of a first microphone signal to a first far-end signal;
attenuating at least one of the first microphone signal and the first far-end signal to output a second microphone signal and a second far-end signal to the echo canceller, the ratio of the second microphone signal to the second far-end signal thereby being different from the calculated ratio; and
controlling the attenuation unit, in dependence on the calculated ratio, so as to alter the ratio of the second microphone signal to the second far-end signal and control the echo-cancelled signal.

18. A method as claimed in claim 17, in which the echo canceller has multiple different modes of operation, the method comprising associating each mode of operation of the gain control system with default attenuations of the first microphone signal and the first far-end signal.

19. A method as claimed in claim 17, comprising:
at the commencement of an estimation, controlling the attenuation unit to apply the default attenuations associated with the echo canceller's mode of operation; and
thereafter, controlling the attenuation unit in dependence on the calculated ratio.

20. A non-transitory machine readable storage medium having stored thereon processor executable instructions implementing a method for dynamically tuning an echo canceller, the echo canceller being configured to estimate an echo of a far-end signal and subtract that estimate from a microphone signal to output an echo cancelled signal, and the method comprising:
calculating a ratio of a first microphone signal to a first far-end signal;
attenuating at least one of the first microphone signal and the first far-end signal to output a second microphone signal and a second far-end signal to the echo canceller, the ratio of the second microphone signal to the second far-end signal thereby being different from the calculated ratio; and
controlling the attenuation unit, in dependence on the calculated ratio, so as to alter the ratio of the second microphone signal to the second far-end signal and control the echo-cancelled signal.

* * * * *